(12) United States Patent
Zhou et al.

(10) Patent No.: US 6,887,916 B2
(45) Date of Patent: May 3, 2005

(54) MATERIALS HAVING CONTROLLED SHRINKAGE AND PATTERNS AND METHODS OF MAKING SAME

(75) Inventors: Peiguang Zhou, Appleton, WI (US); Lance James Garrett, Jr., Neenah, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/751,314

(22) Filed: Dec. 28, 2000

(65) Prior Publication Data

US 2002/0094434 A1 Jul. 18, 2002

(51) Int. Cl.$^7$ .............................. C08F 2/46; B35B 53/02
(52) U.S. Cl. ................... 522/1; 522/71; 522/68; 522/83; 522/81; 522/84; 522/150; 522/148; 522/153; 522/154; 522/157; 522/161; 522/162; 522/111; 522/112; 428/423.1; 428/480; 428/492; 428/500; 428/543
(58) Field of Search .................. 522/71, 68, 1, 522/81, 83, 84, 150, 148, 153, 154, 157, 161, 162, 111, 112, 109, 110; 219/71, 81, 83, 84, 468; 427/510, 521, 512, 513, 557; 428/423.1, 474.4, 480, 492, 500, 543; 156/68, 84

(56) References Cited

U.S. PATENT DOCUMENTS

| | | | |
|---|---|---|---|
| 3,737,488 A | | 6/1973 | Porter et al. |
| 3,962,009 A | | 6/1976 | Minami et al. |
| 4,107,391 A | | 8/1978 | Moore et al. |
| 4,196,033 A | | 4/1980 | Arai et al. |
| 4,278,728 A | | 7/1981 | Honda et al. |
| 4,360,607 A | | 11/1982 | Thorsrud et al. |
| 4,370,189 A | | 1/1983 | Siedenstrang et al. |
| 4,460,676 A | | 7/1984 | Fabel |
| 4,539,060 A | * | 9/1985 | Wittwer et al. .......... 156/275.1 |
| 4,576,850 A | | 3/1986 | Martens |
| 4,714,735 A | * | 12/1987 | Hodgson et al. ............ 524/514 |
| 4,721,738 A | | 1/1988 | Ellis et al. |
| 4,764,395 A | | 8/1988 | Felder et al. |
| 4,816,094 A | | 3/1989 | Pomplun et al. |
| 4,855,553 A | | 8/1989 | Minobe |
| RE33,251 E | * | 7/1990 | Wittwer et al. .......... 156/275.1 |
| 5,108,805 A | * | 4/1992 | Gerard ....................... 215/12.2 |
| 5,127,977 A | | 7/1992 | Eaton et al. |
| 5,182,069 A | * | 1/1993 | Wick ....................... 264/210.2 |
| 5,362,306 A | | 11/1994 | McCarver et al. |
| 5,614,354 A | | 3/1997 | Eguchi et al. |
| 5,685,754 A | | 11/1997 | Nohr et al. |
| 5,798,015 A | | 8/1998 | Nohr et al. |
| 5,840,412 A | | 11/1998 | Wood et al. |
| 5,849,411 A | | 12/1998 | Nohr et al. |
| 5,916,203 A | * | 6/1999 | Brandon et al. ............. 604/367 |
| 6,265,530 B1 | * | 7/2001 | Herr et al. |

FOREIGN PATENT DOCUMENTS

| | | | |
|---|---|---|---|
| EP | 0174188 B1 | * | 7/1989 |
| EP | 0356169 A1 | * | 2/1990 |
| EP | 0629490 | | 12/1994 |
| GB | 1037077 | * | 7/1966 |
| GB | 2 193 147 A | | 2/1988 |
| JP | 354144438 A | | 11/1979 |
| JP | 356161196 A | | 12/1981 |
| JP | 404033936 A | | 2/1992 |
| JP | 405066561 A | | 3/1993 |
| JP | 407013489 A | | 1/1995 |
| WO | WO 96/13434 | | 5/1996 |
| WO | WO 99/40248 | | 8/1999 |

OTHER PUBLICATIONS

Product Descripton for Sharp®R–1405 Microwaveoven.*
Product Description for Sharp® R–1492 Microwave oven.*

* cited by examiner

Primary Examiner—James J. Seidleck
Assistant Examiner—Sanza L. McClendon
(74) Attorney, Agent, or Firm—Patricia A. Charlier

(57) ABSTRACT

A latent material having various controlled shrinkage tensions and patterns and a method of making the same. The materials include polymer materials that are capable of absorbing microwave energy. Different degrees of shrinkage of the material may be controlled to create different tensions in the material. Additionally, various stereo and three-dimensional patterns may be generated on the material. These materials may be used in the formation of personal care articles. The materials are made by incorporating a polymer material onto the film, wherein the polymer material is capable of turning microwave energy into heat. Upon exposure to microwave radiation, the heat will cause the latent material to shrink. The use of different types and amounts of polymer materials will result in a latent material having different tensions and patterns.

23 Claims, 3 Drawing Sheets

MATERIALS HAVING CONTROLLED SHRINKAGE AND PATTERNS AND METHODS OF MAKING SAME

FIELD OF THE INVENTION

This invention relates in general to a latent material having various controlled shrinkage tensions and patterns. The present invention is also directed to a method of making the these materials. These materials are useful in the formation of personal care articles.

BACKGROUND OF THE INVENTION

Personal care products have revolutionized modern lifestyle and are of great convenience to society. Such products generally are relatively inexpensive, sanitary and quick and easy to use. There are many different types of personal care products having different functions and appearances. These include, among others, absorbent incontinence products, such as diapers, training pants and adult incontinence garments; feminine care products, such as pantiliners and sanitary napkins; and tissue products, such as facial tissue and toilet tissue.

Each of these products may include many different features and appearances even among the same type of product. For example, some diapers are designed to be more absorbent while others are designed to be more comfortable. As such, there are large number of materials used in making these products and a corresponding number of processes needed to make these different materials. The large number of materials used can make the processes for making the personal care products complicated and/or expensive.

Microwave energy has been primarily used for food processing. However, recently, it has been used in industry-heating processes, especially to apply microwave technology on consumer personal care articles, such as disposable absorbent products. This microwave energy has been used with some elastomeric materials. Generally, the equipment used in the process to control the elastic material while in a state of tension is generally complex. Additionally, the process can be difficult to control and will sometimes result in a finished material that is wrinkled. The complex equipment is needed because of the difficulty in maintaining the elastic materials in a tension state while consistently and accurately attaching additional materials under low drawing and high web speed.

Conventional latent polymeric materials are more like thermoplastics which appear to be flat and in a non-elastic state at room temperature. Latent polymers can be made by pre-stretching elastic materials. The stretched condition can be maintained by means of forming crystallization or intermolecular forces, such as hydrogen bonding or ionic association. The latent polymers are temperature sensitive materials and can be converted into elastics by applying enough heat to overcome the intermolecular forces. The macromolecule chains of latent polymers can return to their equilibrium state and regain their elastic characteristics. Such a process is called activation of a latent polymer.

Activation of a latent polymer has conventionally be done using hot air heating. It is well known that conventional heat activation is generally accomplished by passing the latent polymer, which is laminated between non-woven facings, through a heated air duct for a period of time. It typically takes several seconds to raise the latent polymer temperature for activation, which results in retraction and regains elasticity. Such a heating process requires large capital investments, huge space, vast amounts of energy, and manufacturing inefficiencies.

Accordingly, what is needed is a single material that may be modified as needed to achieve many different shapes and functions, thereby making the formation of the personal care articles simpler. Also what is needed is a latent polymeric material that may be activated using microwave radiation, thereby reducing the cost and complexity associated with the process of making these materials. Finally, what is needed is a personal care product, such as a disposable absorbent product, that incorporates these latent polymer films.

SUMMARY OF THE INVENTION

The present invention provides a latent polymer film material that may be modified as needed to produce different three-dimensional patterns and different tensions. Therefore, this film material may be used to perform different functions in personal care articles that, heretofore, required several different film materials. As such, the film material of the present invention can reduce the number of processes needed to make personal care products, as well as reducing the number of types of materials used.

The present invention is able to achieve these advantages by providing a heat-sensitive latent polymer film that may be modified through the use of microwave sensitizers that are applied to a polymer film and activated. Depending on the amount of sensitizer used, its placement on the polymer film and the degree of activation, different patterns may be formed on the polymer film. In addition, different tensions may also be achieved, thereby permitting the material to have different functions within the personal care product.

The sensitizers used are selected based upon their dielectric loss factor and the desired final film characteristics. The sensitizers are applied to the heat-sensitive latent polymer material using printing or coating means and then are "activated" using a high speed microwave activation process. The sensitizer turns the microwave energy into heat energy, thereby causing the heat-sensitive polymer film to shrink and results in the thermoplastic latent polymer becoming a thermoplastic elastomer. The amount of heat released from the sensitizer during microwave radiation will depend on the amount of sensitizer used and the nature of the sensitizer, as well as microwave power. Using more sensitizer with a higher dielectric loss factor will result in more heat being generated and, thus, a higher degree of shrinkage of the latent polymer material. Using less sensitizer with a lower dielectric loss factor will result in less heat being generated and a lower degree of shrinkage. Different tensions in the final material may therefore be produced, with the "tension" being defined as the degree of elasticity of the material corresponding to the degree of shrinkage of the latent material. Accordingly, in contrast to prior art heated air methods, microwave energy provides high efficiency and selective heating, can be quickly turned on and off, requires minimal set-up time, space and lower cost capital investment.

The latent material may be "patterned" by applying the sensitizer only to portions of the material, while leaving other portions with no sensitizer. Upon application of the microwave radiation, the areas having the sensitizer will shrink, while the areas with no sensitizer will remain the same. This aspect allows the present invention to be modified as needed to form a material having any desired three-dimensional pattern and/or tension.

These and other features and advantages of the present invention will become apparent after a review of the following detailed description of the disclosed embodiments.

BRIEF DESCRIPTION OF HE DRAWINGS

DETAILED DESCRIPTION OF THE INVENTION

Figure 1:
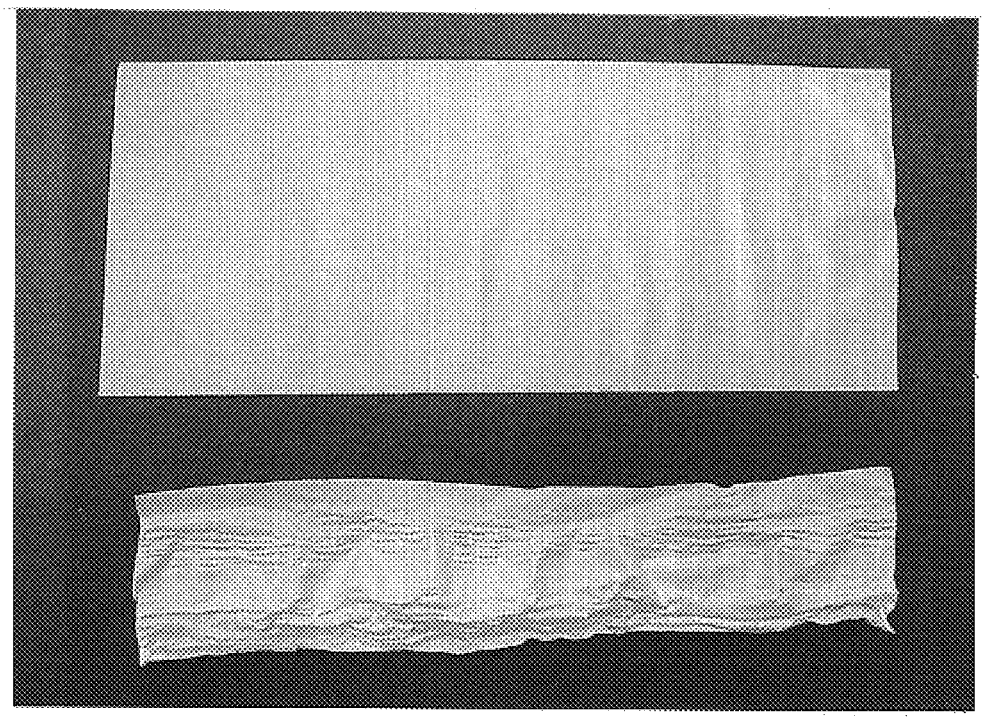
FIG. 1 are photographs showing a polymer film according to one embodiment of the present invention before exposure to microwave radiation and after exposure to microwave radiation.

The present invention is directed to a polymer film that may be customized to form three-dimensional patterns in the film and/or to create a film having different tensions to permit the polymer film to perform a plurality of different functions when used in personal care articles. By being able to use a single material, the films of the present invention are able to simplify the process needed to manufacture these personal care articles. The present invention uses a heat-sensitive latent polymer film material that may be modified to produce these different three-dimensional patterns and/or different tensions.

The heat-sensitive latent polymer film used is modified through the use of microwave energy and a sensitizer material that is placed on the polymer film in select areas. The sensitizer is capable of transforming microwave radiation into heat energy. This heat energy then causes the heat-sensitive polymer film to shrink in areas where the sensitizer is located. The shrinkage may be used to form different three-dimensional patterns in the film and/or may be used to produce different tensions in the film. Generally speaking, the greater the amount of sensitizer used and/or, the higher its dielectric loss factor, the higher the degree of shrinkage that will occur, which depends on the maximum shrinkage capacity of the latent film.

In use, the present invention provides a heat-sensitive latent polymer film that is desired to be treated to produce a polymer film having a desired tension and/or a desired pattern on the film. The film includes the heat-sensitive latent polymer film and a sensitizer. The latent polymer film composite may be activated to achieve the different patterns and tensions. The sensitizer is applied to the polymer film using a coating process such that when microwave radiation is used to activate the latent polymer composite, the sensitizer converts the microwave radiation to heat. The heat will cause the polymer film to shrink. The polymer film will not shrink in areas having no sensitizer. As such, the polymer film may be customized to form the different tensions and/or patterns. Then, the present invention may be used in a personal care article, such as a diaper, feminine care article, or adult incontinence device.

The polymer film is desirably selected based upon the desired final characteristics of the film, its use in the personal care article, the type and amount of sensitizer used, and the level of microwave radiation to be used in activating the sensitizer. The heat-sensitive latent polymer film may be selected from a variety of different materials. Examples of polymer films useful in the present invention include, but are not limited to, Exxon 601; polyether; polyether-polyamide copolymer; polyamide; polyester; polyurethane; polyacrylates; polyester-polyamide copolymer; polyvinylacetate; and ethylene-propylene copolymer. Desirably, the polymer is Exxon 601 or PEBAX®, a polyether-polyamide copolymer available from Elf ATOCHEM. Exxon 601 is a proprietary polymer (U.S. Pat. Nos. 4,714,735 and 5,182,069) comprising from about 20 to about 30 wt. % olefinic elastomer, from about 60 to about 75 wt % ethylene copolymer, from about 4 to about 10 wt. % processing oil, and less than about 5 wt. % other additives.

The thickness of the film may vary depending upon the desired final use of the film. However, one of the advantages of the present invention is that the film may very thin, i.e. from about 1 mil to about 5 mil, which is unlike the films of the prior art.

Alternatively, the polymer material used in the present invention may be in the form of strands. These strands are typically larger than regular fibers and may have a thickness of from about 0.1 mm to about 2.0 mm.

The sensitizer used will depend on the polymer film used, the pattern and/or tension to be formed, the dielectric loss factor of the sensitizer, the amount of sensitizer desired to be used, and level of microwave radiation to be used in activating the sensitizer. The sensitizer is placed on the polymer film and then activated. The dielectric loss factor of the sensitizer will affect the amount of heat released by the sensitizer when exposed to microwave radiation and, consequently, the degree of shrinkage of the polymer film. Examples of sensitizers useful in the present invention include, but are not limited to, homopolymers, block and random copolymers of polyether, polyethylene glycol, and polyether-polyethylene glycol block copolymers; ionic polymers and copolymers, such as polyacrylic acid-sodium salt polymers and copolymers; metal salts; and organic solvents, such as ethanol, isopropanol, water, and combinations thereof. Desirably, the sensitizers comprise from about 10 to about 40 wt. % of polymer or copolymer, from about 2 to about 15 wt. % metal salt, and from about 30 to about 70 wt. % alcohol or water. Desirably, the sensitizer is a polyacrylic acid-sodium salt polymer comprising about 50 g of polyacrylic acid in about 400 g of 1.0 mol NaCl solution. Other sensitizers can be made from inorganic chemicals such as metal particles and metal oxides, such as aluminum, copper, zinc and their oxides, various ferrite e.g. barium and magnesium ferrite and carbon black. In general, a sensitizer used in the present invention is designed to absorb microwave radiation at a frequency of from about 900 to about 3000 MHz, and desirably at about 915 MHz or at about 2450 MHz.

In addition to the polymer film and the sensitizer, the latent materials of the present invention may include other materials, depending on the desired final characteristics of the film. For example, surfactants or cosolvents may be used to adjust the surface tension of the sensitizer on the latent polymer film.

Once the polymer film and sensitizer have been selected, the sensitizer is applied to the polymer film in the desired amounts and locations such that when microwave radiation is used, the desired final characteristics of the final film will be achieved. The sensitizer may be applied to the polymer film using a variety of different methods including, but not limited to, screen printing; roller coating; melt blown coating; bead coating; ultrasonic spray coating, or by directly incorporating the sensitizer into the latent polymer by blending or compounding technologies.

Once the sensitizer has been applied to the polymer film, the different tensions and/or patterns in the film are created by activating the sensitizer under microwave radiation such that heat is generated, thereby causing shrinkage in the desired areas of the polymer film. Microwave energy is an electromagnetic energy which has wavelengths from 1.0 cm to 1.0 m corresponding to frequencies in the range of $3\times10^8$ to $3\times10^{10}$ Hz. It is noted that the frequencies are in between IR and radio frequencies and only two standard microwave frequencies are generally available for use in the present invention, 915 MHz and 2450 MHz.

Desirably, the sensitizer is activated using a high speed microwave activation process. This process desirably uses a microwave oven set at a power of about 900 W and a frequency of about 2450 MHz. A representative microwave oven that may be used in the present invention is the TM-010 mode tubular-type microwave oven available from IBM. In the activation process, the polymer film having the sensitizer thereon is placed on a web. The web is then started and the polymer film is passed through an area where it is subjected to microwave radiation. As the film passes through the radiation, the radiation activates the sensitizer. The sensitizer turns the radiation into heat energy, thereby causing shrinkage of the polymer film. The greater the dielectric loss factor of the sensitizer and the greater the amount of sensitizer, the greater the amount of heat released and the greater the degree of shrinkage of the polymer film, which is in the limitation of the film shrinkage capacity.

However, to ensure the selective shrinkage of the polymer film to only those areas containing the sensitizer, other process parameters may need to be considered. If the speed of the web is too slow, areas of the polymer film not having any sensitizer may shrink as the radiation may heat the polymer film, thereby causing shrinkage of the polymer film directly. Accordingly, it is desired that the web move at a sufficient speed to reduce this likelihood. Desirably, the web moves at a rate of greater than about 200 feet/minute. More desirably, the web moves at a rate of greater than about 250 feet/minute. Most desirably, the web moves at a rate of greater than about 300 feet/minute. A high speed web is desired for use in a production line.

Additionally, the level of radiation is desired to be as high as possible such that the web speed can be faster. However, due to the microwave absorbency of the film, the processes of the present invention are generally limited by the dielectric loss factor (e") of the materials employed. Generally, microwave energy is absorbed by molecules through the polarization or dipole reorientation (or rotation) of the function groups, and/or by ionic movements, which is translated into thermal energy. As a result, materials can be heated using microwave irradiation in the molecular level. The heat is generated within each molecule and thereby a uniform heating pattern can be created in the material. In this manner, the material can be heated up very efficiently as compared to conventional heating.

The dielectric heating of a material is dependent on the dielectric properties of a material, which can be described by two parameters: the dielectric constant (e') and the dielectric loss factor (e"). If the dielectric loss factor is too low, the material will be transparent to microwave radiation, regardless of the microwave power. As such, the higher the dielectric loss factor of the material, the higher the microwave power can be and the higher the web speed can be. Generally, it is desired that the materials used will permit the microwave power to be greater than about 1.0 kW. More desirably, the microwave power is greater than about 3.0 kW and most desirably, the microwave power is greater than about 6.0 kW.

After the desired patterns and/or tensions have been incorporated into the polymer film, the film may be used in a process or system designed to manufacture personal care articles. The personal care articles may include only a single film according to the present invention, or may use a plurality of different films. These different films may be similar in nature or they may each have different patterns and/or tensions, depending on their desired use within the personal care article.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Example 1

In this Example, the heat-sensitive latent polymer film was Exxon 601 from Exxon. As discussed, Exxon 601 comprises from about 20 to about 30 wt. % olefinic elastomer, from about 60 to about 75 wt % ethylene copolymer, from about 4 to about 10 wt. % processing oil, and less than about 5 wt. % other additives. The original size of cross section of the Exxon 601 film was 104 mm. The sensitizer was ASS-2 (50 g of polyacrylic acid (MW=5100) in about 400 g of 1.0 mol NaCl solution). The sensitizer was applied using an ultrasonic spray coating technique. The sensitizer was applied in a continuous wave pattern. The average amount of sensitizer ASS-2 used was 3–4 gsm addition. However, in the center (with 15–20 mm wide) the amount of sensitizer ASS-2 used was 5–6 gsm. One side edge (about 6–10 mm wide) had no sensitizer applied. Microwave radiation was applied to the film. The web speed was 300 ft/min and the power was 2.0 kW using high efficiency microwave oven model TM-010 mode tubular-type microwave oven available from IBM.

The average amount of shrinkage was about 55%, with continuous wave pattern obtained after microwave radiation. Additionally, the amount of shrinkage in the center thickness (which had the larger amount of sensitizer) was increased to about 0.0005 inches as compared to the original thickness of the film of about 0.0002 inches. In the areas with an average amount of sensitizer of 3–4 gsm, the average thickness of the film after shrinkage was about 0.00025 to about 0.0003 inches. No shrinkage was found and no change of the thickness observed in the areas where no sensitizer was applied. The samples are shown in FIG. 1. FIG. 1*a* shows the original film, while FIG. 1*b* shows how the film has shrunk from microwave radiation.

Example 2

Figure 2:
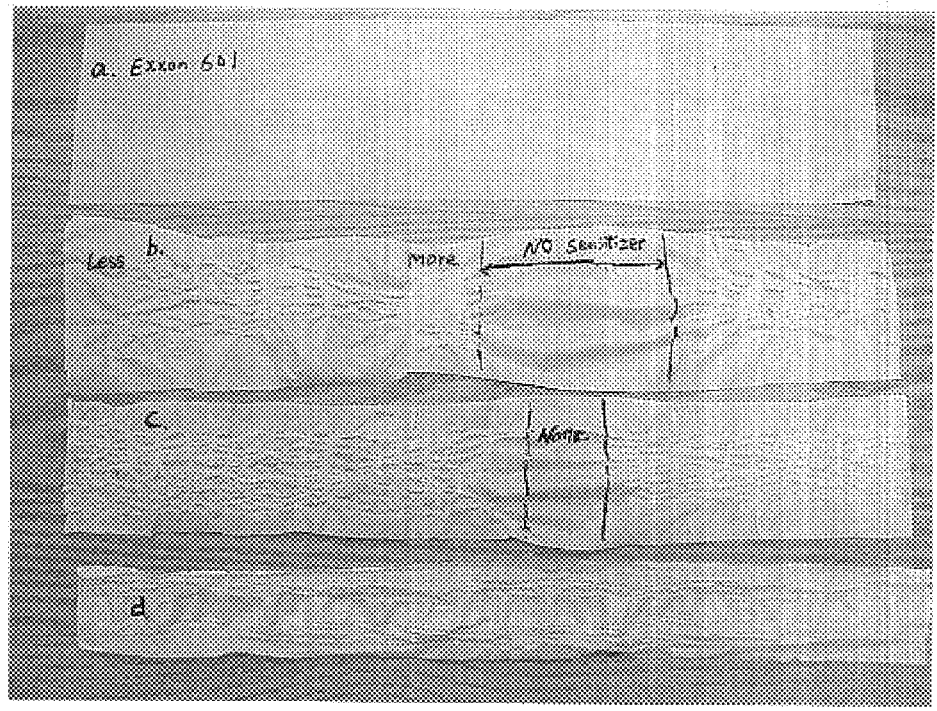
FIG. 2 are photographs showing a polymer film according to one embodiment of the present invention before exposure to microwave radiation and after exposure to microwave radiation with different amounts and locations of sensitizer.

In this Example, the polymer film from Example 1 was coated with sensitizer ASS-1 (50 g of polyacrylic acid (MW=2000) in about 400 g of 1.0 mol NaCl solution) in two sections. One section was coated using a brush to form a dried coating thickness of the sensitizer in the range of 0.001–0.002 mm. The other was slightly coated with the same sensitizer to form a dried coating thickness of less than about 0.0005 mm. No sensitizer was located in the middle region between the two sections. Microwave radiation was applied to the film. The web speed was 300 ft/min and the power was 2.0 kW. FIG. 2*a* shows the original film, while FIGS. 2*b–c* show how the film has shrunk from microwave radiation. In FIG. 2b, less sensitizer was used than in FIG. 2c. FIG. 2d shows the polymer film wherein the entire film was spray coated with the ASS-1 sensitizer.

The average shrinkage for the first section after microwave radiation was more than 40% with a thickness increasing from original 0.0002 inches to amount 0.0005–0.0006 inches. As a comparison, the second section with less sensitizer coated its shrinkage was less than 10%. The middle region showed no change in the thickness and no shrinkage from the original after microwave radiation.

Examples 3–5

Figure 3:
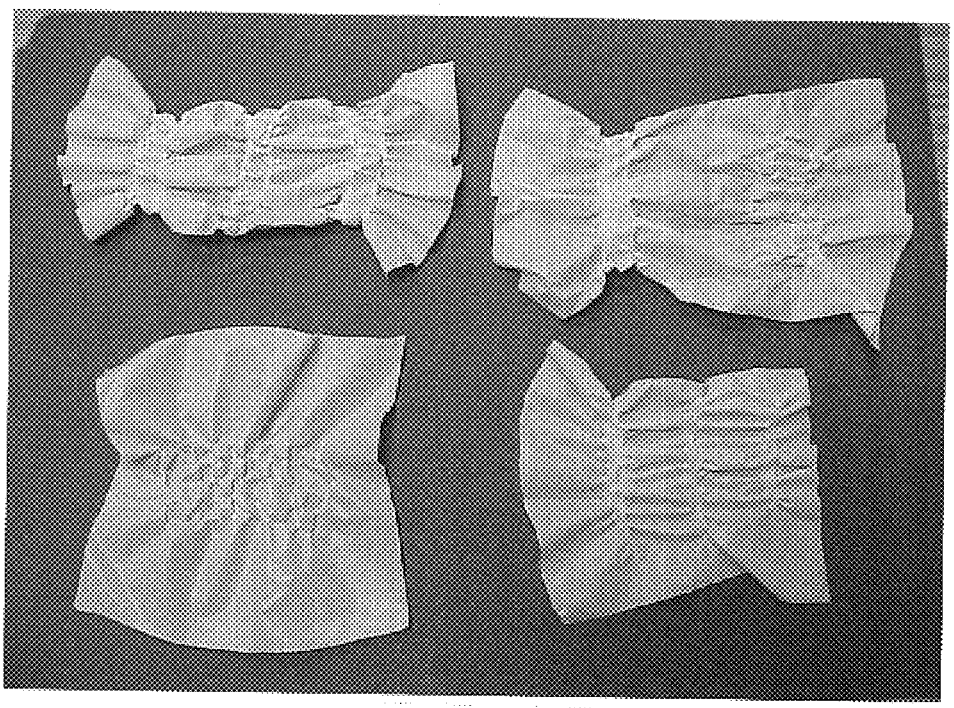
FIGS. 3–5 are photographs showing different patterns on a polymer film according to one embodiment of the present invention that are created by microwave radiation with a microwave sensitizer applied.
Figure 4:
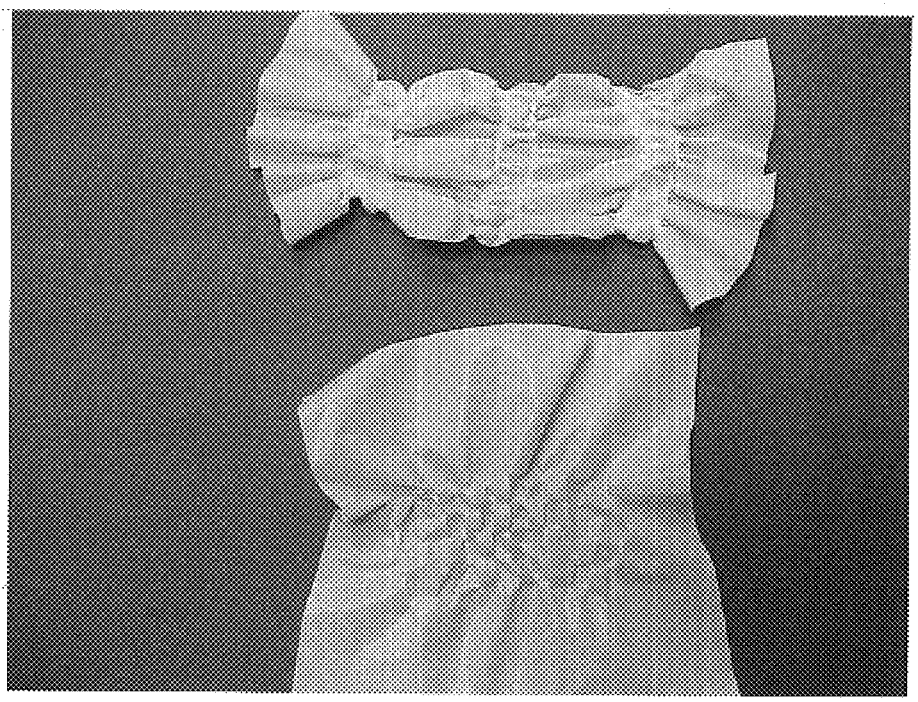
Figure 5:
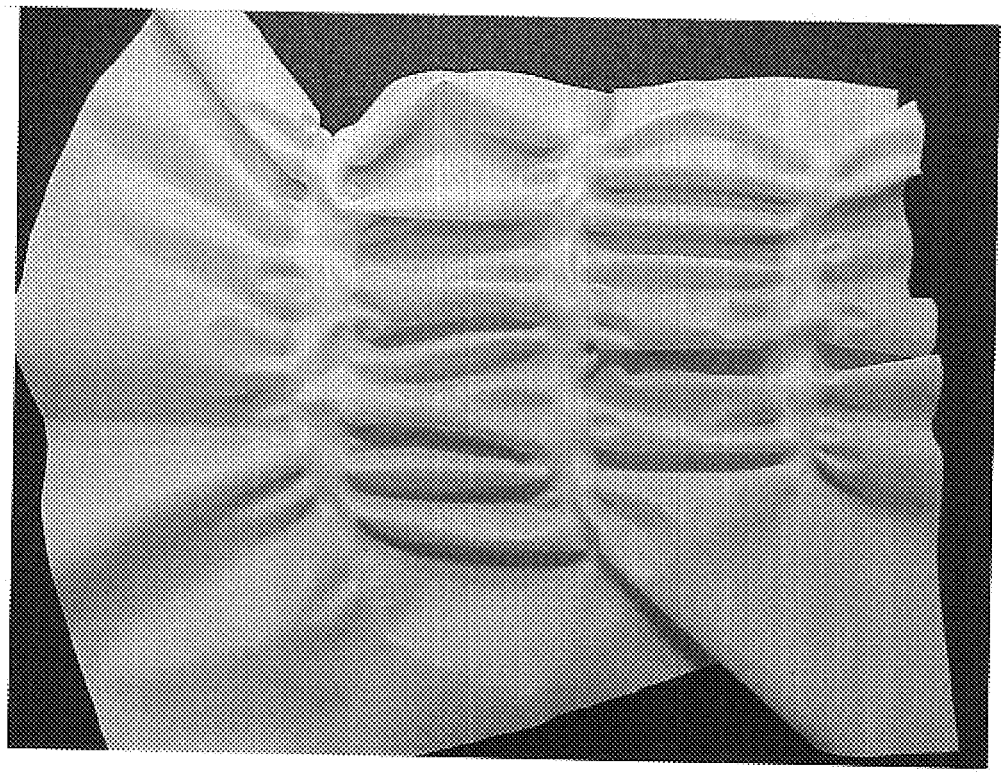

In these Examples, the polymer film from Example 1 was coated with a sensitizer composition in various patterns. The sensitizer composition comprised about 20 to about 50 wt. % polyethylene-polyethylene glycol block copolymer and/or polypropylene glycol and polyethylene glycol block copolymer; about 30 to about 70 wt. % 1.0 and/or 2.0 mol NaCl solution, and less than about 1.0 wt. % CS-1 surfactant (BASF). The sensitizer was applied to the polymer film using a screen printing process. Next, the samples were exposed to microwave radiation using a conventional microwave-cooking oven (Sharp Mode Carousel) having an output power of 900 W at a frequency of 2450 MHz. The oven used a Teflon support plate to minimize microwave energy absorption by the glass plate. The samples were exposed to radiation for about 5 seconds. The results can be seen in FIGS. 3, 4 and 5, which show how the selective application of the sensitizer and the subsequent exposure to microwave radiation resulted in latent polymer films having different shapes and/or tensions.

Those skilled in the art will recognize that the present invention is capable of many modifications and variations without departing from the scope thereof. Accordingly, the detailed description and examples set forth above are meant to be illustrative only and are not intended to limit, in any manner, the scope of the invention as set forth in the appended claims.

What is claimed is:

1. A method of making a material comprising:
   providing a heat-sensitive latent polymer material;
   applying a sensitizer to at least a portion of the polymer material; and
   exposing the polymer material having the sensitizer thereon to microwave radiation, wherein the microwave radiation is at a power greater than about 1.0 kW.

2. The method of claim 1, wherein the heat-sensitive latent polymer material is selected from olefinic elastomer-ethylene copolymer; polyether; polyether-polyamide copolymer; polyamide; polyester; polyurethane; polyacrylates; polyester-polyamide copolymer; polyvinylacetate; or ethylene-propylene copolymer.

3. The method of claim 1, wherein the sensitizer is selected from homopolymers, block and random copolymers of polyether, polyethylene glycol, and polyether-polyethylene glycol; ionic polymers and copolymers; metal salts; organic solvents; or combinations thereof.

4. The method of claim 1, wherein the polymer material having the sensitizer thereon is placed on a web and is passed through the microwave radiation at a preselected web speed.

5. The method of claim 4, wherein the web speed is greater than about 200 ft/min.

6. The method of claim 5, wherein the web speed Is greater than about 250 ft/min.

7. The method of claim 6, wherein the web speed is greater than about 300 ft/min.

8. The method of claim 1, wherein the microwave radiation is at a power greater than about 3.0 kW.

9. The method of claim 1, wherein the microwave radiation is at a power greater than about 6.0 kW.

10. The method of claim 1, wherein the sensitizer is applied to the polymer material using a coating technique.

11. The method of claim 10, wherein the coating technique is selected from screen printing; roller coating; melt blown coating; bead coating: ultrasonic spray coating, or by directly incorporating the sensitizer into the latent polymer by blending or compounding technologies.

12. The method of claim 1, wherein the polymer material is in the shape of a film.

13. The method of claim 1, wherein the polymer material is in the shape of a strand.

14. A patterned material having a controlled tension made from a process comprising:
   providing a heat-sensitive latent polymer material;
   applying a sensitizer to at least a portion of the polymer material; and
   exposing the polymer material having the sensitizer thereon to microwave radiation, wherein the microwave radiation is at a power greater than about 1.0 kW.

15. The patterned material of claim 14, wherein the polymer material having the sensitizer thereon is placed on a web and is passed through the microwave radiation at a web speed of greater than about 300 ft/min.

16. The patterned material of claim 14, wherein the microwave radiation is at a power greater than about 3.0 kW.

17. The patterned material of claim 14, wherein the microwave radiation is at a power greater than about 6.0 kW.

18. The patterned material of claim 14, wherein the microwave radiation is at a power of about 900 W, at a frequency of about 2450 MHz, and is at a duration of about 5 seconds.

19. The patterned material of claim 14, wherein the heat-sensitive latent polymer film is selected from olefinic elastomer-ethylene copolymer; polyether; polyether-polyamide copolymer; polyamide; polyester, polyurethane; polyacrylates; polyester-polyamide copolymer; polyvinylacetate; or ethylene-propylene copolymer.

20. The patterned material of claim 14, wherein the sensitizer is selected from homopolymers, block and random copolymers of polyether, polyethylene glycol, and polyether-polyethylene glycol; ionic polymers and copolymer; metal salts; organic solvents; or combinations thereof.

21. The patterned material of claim 14, wherein the sensitizer is applied to the polymer material using a coating technique that is selected from screen printing; roller coating; melt blown coating; bead coating; ultrasonic spray coating, or by directly incorporating the sensitizer into the latent polymer by blending or compounding technologies.

22. The patterned material of claim 14, wherein the polymer material is in the shape of a film.

23. The patterned material of claim 14, wherein the polymer material is in the shape of a strand.

* * * * *